F. ROSEN.
COMBINATION UTENSIL.
APPLICATION FILED NOV. 21, 1918.
1,381,339. Patented June 14, 1921.
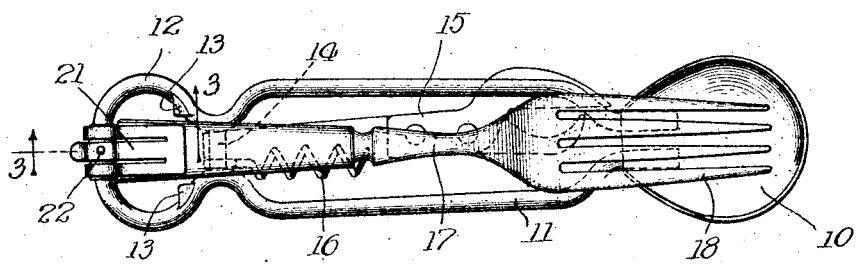
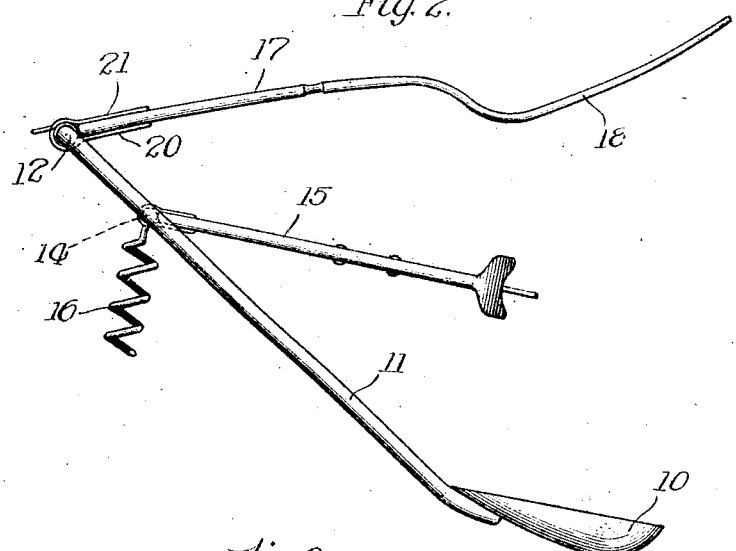
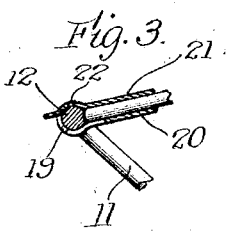
Witness:
Inventor:
Fred Rosen.
By Albert E. Bell
Atty.

UNITED STATES PATENT OFFICE.

FRED ROSEN, OF CHICAGO, ILLINOIS.

COMBINATION UTENSIL.

1,381,339.  Specification of Letters Patent.  Patented June 14, 1921.

Application filed November 21, 1918. Serial No. 263,469.

*To all whom it may concern:*

Be it known that I, FRED ROSEN, a citizen of the United States, residing at Chicago, in the county of Cook and State of Illinois, have invented a certain new and useful Improvement in Combination Utensils, of which the following is a specification.

My invention relates to an improved form of combination utensil consisting of a spoon, a fork, a can-opener, a corkscrew, and a bottle-opener associated in such a manner that a common handle serves for all of the devices and that the devices may be folded in compact form when not in use.

My invention will be best understood by reference to the accompanying drawings showing a preferred embodiment thereof in which—

Figure 1 shows the utensil in folded condition in plan view,

Fig. 2 shows the utensil in side view in partially opened condition, and

Fig. 3 is a sectional view through the pivotal connection between the fork and the spoon taken along the line 3—3 in Fig. 1, and shows the devices employed for locking the handle portion of the fork and spoon in open position.

Similar numerals refer to similar parts throughout the several views.

As shown in the drawings, the utensil consists of a spoon 10, to which a short handle 11 is secured, said handle being preferably of skeleton construction and consisting of a double wire or rod forming at the end of said handle portion a loop 12 having inwardly projecting lugs 13, said loop and lugs being proportioned so that the lugs may engage crimped bottle-stoppers to remove the same from the bottles. To strengthen the device and hold the lugs 13 rigidly in proper position a cross-piece 14 is located between the side members of the handle 11 adjacent said lugs, and upon said cross-piece a can-opener 15 and a corkscrew 16 are pivotally mounted so as to lie between the side members of said handle when these devices are not in use.

The end of the loop 12 has pivotally connected therewith the end of the handle portion 17 of a fork 18, so that said fork may be swung away from the spoon 10 or toward said spoon according as the device is in use or the utensil is in folded condition. The length of the handles 11 and 17 is such that when the fork 18 is swung away from the spoon 10 so that said handles lie in substantially the same line, said handles coöperate to form a common handle of adequate length for the use of either the spoon or the fork, while the individual handles may be relatively short so that the utensil folds into small space. The parts are connected in such a manner that the curved tines of the fork rest in the curved portion of the spoon thus permitting the folding of the device into small space.

To hold the handles 11 and 17 in line with each other to permit the use of the several devices, the end portion of the loop 12 is provided with a projecting pin or stud 19 which moves in a clearance slot therefor in the clip band 20 employed to pivotally connect the handles 11 and 17. On the upper face of the end of the handle 17 a spring 21 is secured resting upon the loop 12 which spring is provided with a hole 22 for engaging the pin 19 when the handles 11 and 17 are in line with each other thus serving to lock said handles in position for use and affording a reasonably rigid connection between said handles.

The utensil described is useful for many purposes, as for example in connection with camping outfits or as a part of traveling outfits where it is desirable to afford a maximum of service and convenience with a minimum of space occupied by the utensil. It will be understood that I do not limit myself in carrying out my invention to the exact construction and proportions shown, as I may employ any equivalents thereof known to the art at the time of the filing of this application without departing from the scope of the appended claims. For example, I do not limit myself to any particular size of spoon or fork nor to any particular length of the handle portions, the desirable thing being that the parts shall in any event be made of such shape and proportions as to fold as compactly as possible and afford a maximum degree of convenience in use.

What I claim is:

1. In a device of the class described, the combination of a handle formed from a metal rod folded into two side members substantially parallel with each other and each bent near the mid-portion of the folded rod to form a loop, a spoon bowl secured to the ends of the folded rod, and a reinforcing bar extending between the side members of the handle at the inner sides of said loops.

2. In a device of the class described, the combination of a handle formed from a metal rod folded into two side members substantially parallel with each other and each bent near the mid-portion of the folded rod to form a loop, a spoon bowl secured to the ends of the folded rod, a reinforcing bar extending between the side members of the handle at the inner sides of said loops, and a fork pivotally connected to the end of said loop to fold against said handle and spoon bowl.

3. In a device of the class described, the combination of a handle formed from a metal rod folded into two side members substantially parallel with each other and each bent near the mid-portion of the folded rod to form a loop, a spoon bowl secured to the ends of the folded rod, a reinforcing bar extending between the side members of the handle at the inner sides of said loops, a fork pivotally connected to the end of said loop to fold against said handle and spoon bowl, and a spring for holding the parts in opened relation with the fork extending away from said handle.

4. In a device of the class described, the combination of a handle formed from a metal rod folded into two side members substantially parallel with each other and each bent near the mid-portion of the folded rod to form a loop, a spoon bowl secured to the ends of the folded rod, a reinforcing bar extending between the side members of the handle at the inner sides of said loops, and a fork pivotally connected to the end of said loop and so disposed that the ends of its tines lie in said spoon bowl in folded relation.

In witness whereof, I hereunto subscribe my name this 11th day of November, A. D. 1918.

FRED ROSEN.